(12) United States Patent
Obeid et al.

(10) Patent No.: US 9,723,384 B2
(45) Date of Patent: Aug. 1, 2017

(54) SINGLE SYNCHRONOUS FIFO IN A UNIVERSAL ASYNCHRONOUS RECEIVER/TRANSMITTER SYSTEM

(71) Applicant: King Abdulaziz City for Science and Technology, Riyadh (SA)

(72) Inventors: Abdulfattah Mohammad Obeid, Riyadh (SA); Mohammed Sulaiman BenSaleh, Riyadh (SA); Abdullah Alawi AlJuffri, Riyadh (SA); Syed Manzoor Qasim, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 0 days.

(21) Appl. No.: 14/832,016

(22) Filed: Aug. 21, 2015

(65) Prior Publication Data
US 2017/0054578 A1 Feb. 23, 2017

(51) Int. Cl.
*H04L 27/00* (2006.01)
*H04Q 11/00* (2006.01)

(52) U.S. Cl.
CPC .................................. *H04Q 11/00* (2013.01)

(58) Field of Classification Search
None
See application file for complete search history.

(56) References Cited

U.S. PATENT DOCUMENTS

| | | |
|---|---|---|
| 4,949,333 A | 8/1990 | Gulick et al. |
| 5,140,679 A | 8/1992 | Michael |
| 5,572,676 A | 11/1996 | Ohnishi |
| 5,862,354 A | 1/1999 | Curiger et al. |
| 6,272,452 B1 | 8/2001 | Wu et al. |
| 6,381,661 B1 | 4/2002 | Messerly et al. |
| 7,191,262 B2 | 3/2007 | Sleeman |
| 7,260,660 B1 * | 8/2007 | Nekl ............... G06F 13/4286 370/463 |
| 7,895,301 B1 * | 2/2011 | Mui ................ G06F 13/4286 341/176 |

(Continued)

FOREIGN PATENT DOCUMENTS

| | | |
|---|---|---|
| EP | 0364720 | 4/1990 |
| EP | 0898821 | 9/2005 |

OTHER PUBLICATIONS

Fang Yi-yuan; Chen Xue-jun, "Design and Simulation of UART Serial Communication Module Based on VHDL," Intelligent Systems and Applications (ISA), pp. 1-4, May 28-29, 2011.

(Continued)

*Primary Examiner* — Shuwang Liu
*Assistant Examiner* — Gina McKie
(74) *Attorney, Agent, or Firm* — Andrew M. Calderon; Roberts Mlotkowski Safran Cole & Calderon, P.C.

(57) ABSTRACT

A UART device includes a glue logic configured to receive data from either a computer processing unit (CPU) interface of the UART device or from a receiver interface of the UART device; determine whether the data was received from the CPU interface or the receiver interface; and add a most significant bit (MSB) to the data. A value of the MSB is based on whether the data was received from the CPU interface or the receiver interface. The UART device may write the data with the added MSB to a data buffering and storage component.

20 Claims, 3 Drawing Sheets

(56) References Cited

U.S. PATENT DOCUMENTS

| | | | |
|---|---|---|---|
| 7,899,956 B2 | 3/2011 | Sollenberger et al. | |
| 8,954,622 B1* | 2/2015 | Wang | G06F 13/385 |
| | | | 710/10 |
| 2006/0245533 A1 | 11/2006 | Rostampour | |
| 2009/0175283 A1* | 7/2009 | Jan | G06F 13/4045 |
| | | | 370/401 |
| 2015/0016464 A1* | 1/2015 | Chan | H04L 45/74 |
| | | | 370/401 |
| 2017/0110204 A1* | 4/2017 | Kothiala | G11C 29/44 |

OTHER PUBLICATIONS

Shouqian Yu; Lili Yi; Weihai Chen; Zhaojin Wen, "Implementation of a Multi-channel UART Controller Based on FIFO Technique and FPGA," pp. 2633-2638, May 23-25, 2007.

* cited by examiner

SINGLE SYNCHRONOUS FIFO IN A UNIVERSAL ASYNCHRONOUS RECEIVER/TRANSMITTER SYSTEM

FIELD OF THE INVENTION

The invention relates to data translation using a Universal Asynchronous Receiver/Transmitter (UART), and more particularly, to UART systems with a single synchronous First-in-First-Out (FIFO) storage component.

BACKGROUND OF THE INVENTION

A Universal Asynchronous Receiver/Transmitter (UART) is a piece of computer hardware that translates data between parallel and serial forms. A UART is an integrated circuit used for serial communication that contains a receiver (serial-to-parallel converter) and a transmitter (parallel-to-serial converter), each clocked separately. The parallel side of a UART can be connected to the bus of a computer. When the computer writes a byte to the transmit data register of a UART, the UART will start to transmit the data on the serial line. UARTs are often used with communication standards such as EIA, RS-422, RS-232 or RS-485. The universal designation indicates that the transmission speeds and data format are configurable and that the electric signaling levels and methods are typically handled by a special driver circuit that is external to the UART.

UARTs are often included in microcontrollers. A dual UART (DUART) combines two UARTs into a single chip. Several modern integrated circuits now come with a UART that can also communicate synchronously. Such a device is called a universal synchronous/asynchronous receiver/transmitter (USART).

The UART circuit generally includes five components i.e., a transmitter, receiver, a baud rate generator, first-in-first-out (FIFO) storage components, and a CPU interface module. The transmitter module converts the incoming parallel data into serial data and sends it through a transmit channel; wherein the receiver module does the opposite function. The baud rate generator generates different clocks for the UART receiver and transmitter channel depending on the configuration. Two FIFOs are used for buffering data in and out from the UART. The CPU interface module connects the UART protocol to microcontroller based system.

There are two types of UARTs which are based on the usage of FIFOs. The first type is the UART with Dual Asynchronous FIFOs. This is the most commonly used UART design. In this design, two asynchronous FIFOs are utilized between the receiver/transmitter channel and the CPU interface channel. The second type of UART is the UART with two synchronous FIFOs. In this design, instead of using asynchronous FIFOs, the data is synchronized and two synchronous FIFOs are used for buffering the data. This design is not commonly used since the UART is an asynchronous device.

SUMMARY OF THE INVENTION

In an aspect of the invention, a method comprises receiving data from either a computer processing unit (CPU) interface of the computing device or from a receiver interface; determining whether the data was received from the CPU interface or the receiver interface; and adding a most significant bit (MSB) to the data. A value of the MSB is based on whether the data was received from the CPU interface or the receiver interface. The method further comprises writing the data with the added MSB to a data buffering and storage component.

In an aspect of the invention, a Universal Asynchronous Receiver/Transmitter (UART) comprises a glue logic configured to receive data from either a computer processing unit (CPU) interface of the UART device or from a receiver interface of the UART device; determine whether the data was received from the CPU interface or the receiver interface; add a most significant bit (MSB) to the data, where a value of the MSB is based on whether the data was received from the CPU interface or the receiver interface; write the data with the added MSB to a data buffering and storage component; read the data from the data buffering and storage component; identify the value of the MSB included in the data; and write the data, based on the value of the MSB, to a channel associated with the CPU interface or to a channel associated with a transmitter component interface of the UART device.

In an aspect of the invention, a system comprises a CPU interface; a receiver interface; a transmitter interface; a synchronous FIFO data storage component; and a glue logic configured to receive data from either the CPU interface or the receiver interface; determine whether the data was received from the CPU interface or the receiver interface; add a most significant bit (MSB) to the data, wherein a value of the MSB is based on whether the data was received from the CPU interface or the receiver interface; write the data with the added MSB to the synchronous FIFO data storage component; read the data from the synchronous FIFO data storage component; identify the value of the MSB included in the data; and write the data, based on the value of the MSB, to a channel associated with the CPU interface or to a channel associated with the transmitter interface.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
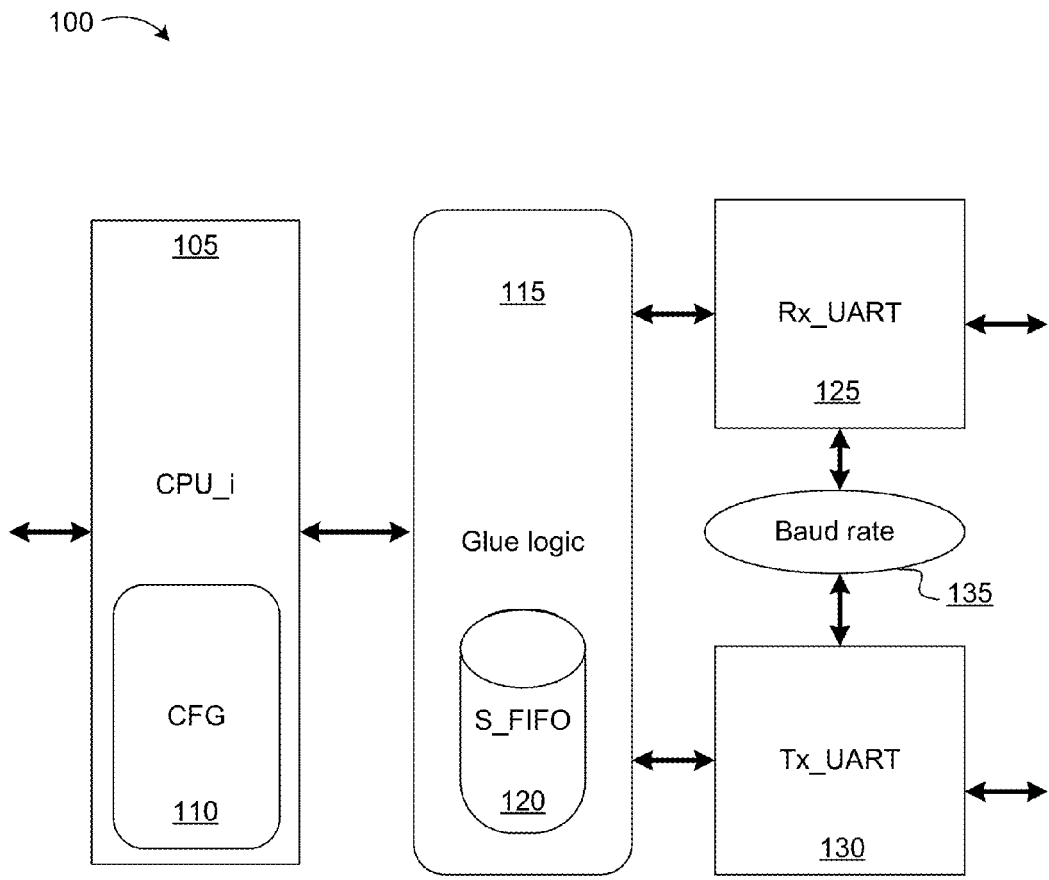
FIG. 1 shows a block diagram showing a single synchronous FIFO UART architecture in accordance with aspects of the present invention.

The invention relate to data translation using a Universal Asynchronous Receiver/Transmitter (UART), and more particularly, to UART systems with a single synchronous First-in-First-Out (FIFO) storage component. In accordance with aspects of the present invention, a UART device may include a glue logic which may add (append or write) a Most Significant Bit (MSB) to a series of bits representing data, e.g., data that is either received by the UART device, or data that is to be sent from the UART device. In this way, the glue logic controls traffic between two interface channels, e.g., between a CPU interface channel and a transmitter interface channel. In embodiments, the glue logic may add an extra single bit, e.g., the MSB, to the FIFO data width. The extra bit controls the data out from the FIFO, deciding whether the data should be sent to the transmitter channel or CPU channel. In the case of writing data to the FIFO, a shift register keeps a record as to whether it has been writing from the CPU channel or the receiver channel. This record is represented by the MSB. By adding the MSB, only one synchronous FIFO need be used between the two interface channels instead of two asynchronous FIFOs as in conventional UART systems. Advantageously, the size of the UART design is minimized, while full functionality is maintained.

In embodiments, the MSB indicates whether the data was received by a receiver component of the UART device, e.g., from a component external to the UART device, or whether the data was generated by a CPU of the UART device, e.g., for transmission of the data from the UART device to a component external to the UART device. For example, a bit of "0" may indicate that the data was generated by the CPU of the UART device, and a bit of "1" may indicate that the data was received by the receiver component of the UART device. Alternatively, a bit of "1" may indicate that the data was generated by the CPU of the UART device, and a bit of "0" may indicate that the data was received by the receiver component of the UART device. That is, the value of the MSB indicates whether the data was received from CPU or the receiver component. Once the glue logic has added the MSB, the data with the added MSB may be stored in the FIFO.

When the data is later read from the FIFO, the data is either written to a CPU interface of the UART device, e.g., when the data is received from an external component, or written to a transmitter interface of the UART device, e.g., when the data is generated by the CPU and sent to an external component.

For example, the glue logic reads the data from the FIFO, and identifies the MSB. Based on the MSB, the glue logic writes the data to either a transmitter interface of the UART device, or to a CPU interface of the UART device. For example, assume that MSB of "0" indicates that the data was generated by CPU of the UART device. Further, assume that the data, read from the FIFO, includes an MSB of "0". Given these assumptions, the glue logic determines that the data was generated by the CPU, and that the data should be transmitted by the transmitter component of the UART device. The glue logic may then write the data to the transmitter interface. Continuing with the above example, assume that data, read from the FIFO, includes an MSB of "1". Given this assumption, the glue logic determines that the data was received by the receiver of the UART device. The glue logic may then write the data to the CPU interface of the UART device for further processing.

Advantageously, embodiments of the present invention may downsize the area of the overall UART circuit design. More specifically, only one FIFO is used as opposed to two FIFOs thereby downsizing the area of the overall UART design. Further, the idle time of the FIFO is minimized, particularly in situations where only the receiver or transmitter channel is primarily used, e.g., in situations in which a large amount of data are being either received or transmitted. For example, the idle time is minimized since only a single FIFO is used instead of two FIFOs, as in traditional UART devices, e.g., in which one of the FIFOs would be substantially idle in a situation in which a large amount of data are being either received or transmitted.

Figure 2:
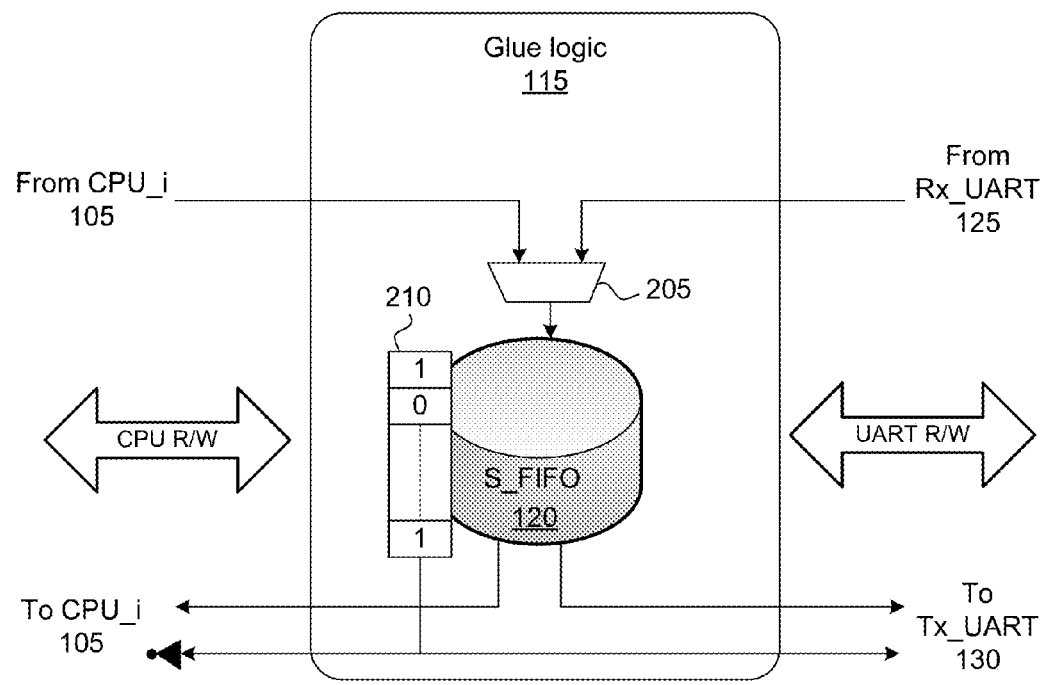
FIG. 2 shows a block diagram of functional components and processes of a glue logic in accordance with aspects of the present invention.
Figure 3:
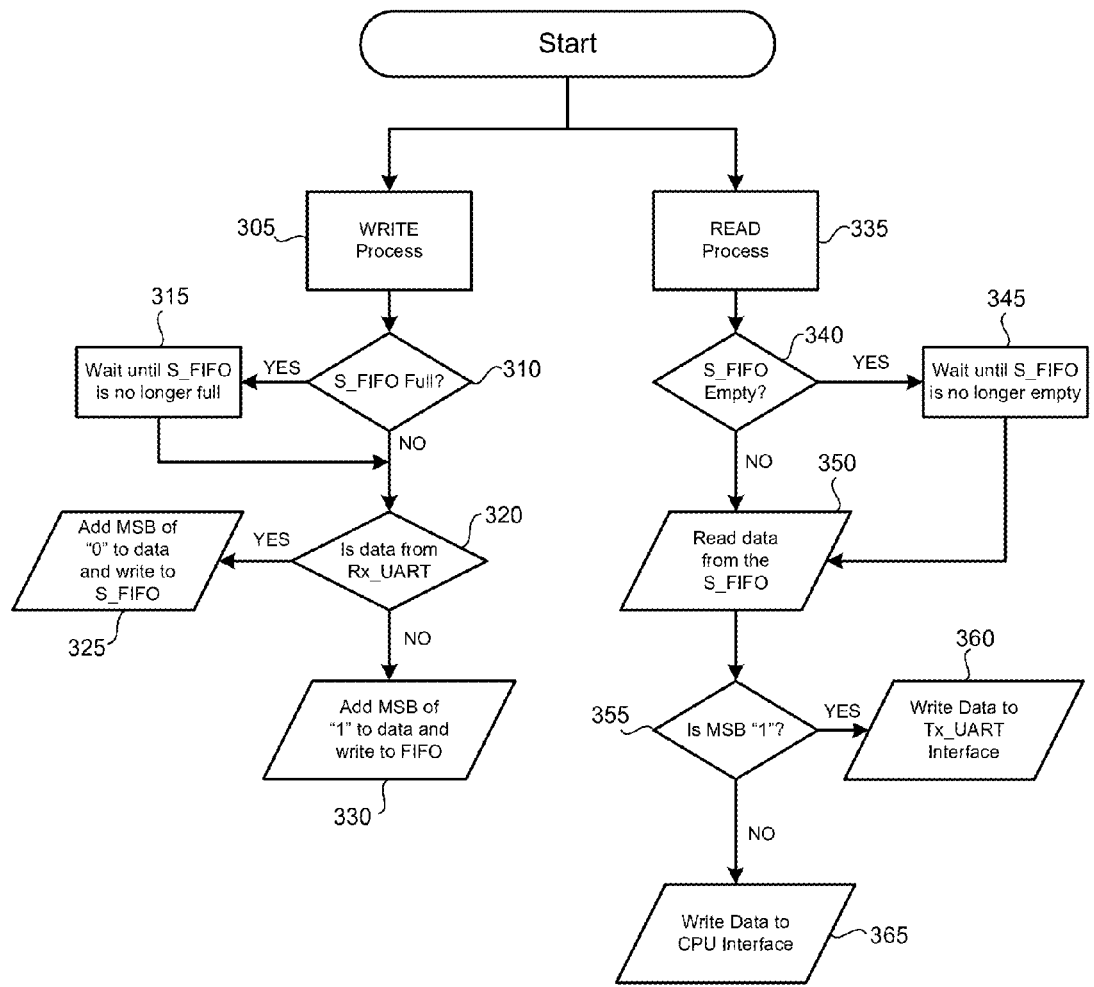
FIG. 3 shows a flow chart of example processes of reading and writing data to and from CPU and UART interfaces using a single synchronous FIFO UART architecture in accordance with aspects of the present invention.

FIGS. 1-3 show block diagrams and a flowchart of processes of aspects of the present invention. The block diagram and flowchart in FIGS. 1-3 illustrate the architecture, functionality, and operation of possible implementations of systems, methods, and computer program products according to various embodiments of the present invention. In this regard, each block in the flowchart may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustration, and combinations of blocks in the flowchart illustration, can be implemented by special purpose hardware-based systems that perform the specified functions or acts or carry out combinations of special purpose hardware and computer instructions.

FIG. 1 shows a block diagram showing a single synchronous FIFO UART architecture in accordance with aspects of the present invention. As shown in FIG. 1, a UART device 100 may include a CPU interface (CPU_i) 105 having a configuration (CFG) component 110. The UART device 100 may further include a glue logic 115 having a single synchronous FIFO storage system (S_FIFO) 120. The UART device 100 may further include a receiver (Rx_UART) 125, a transmitter (Tx_UART) 130, and a baud rate component 135.

The CPU_i 105 may receive data in a parallel format from the glue logic 115. For example, the received data may be sent by a component external to the UART device 100 and received by the Rx_UART 125. As described herein, the data may be buffered and/or stored by the S_FIFO 120 before the data is received by the CPU_i 105. When the data is received, the CPU_i 105 may further process the data. The CPU_i 105 may also output data for transmission to another device external to the UART device 100, e.g., via the Tx_UART 130. In embodiments, the CFG component 110 may facilitate data processing and/or transmission.

The glue logic 115 may be implemented in a data stream that is between the CPU of the UART device 100, and the Rx_UART 125 and Tx_UART 130 components of the UART device 100. The glue logic 115 includes the S_FIFO 120, which may be a data buffering and storage component. Data is received by the glue logic 115 by the CPU_i 105 and by the Rx_UART 125. When data is received, the glue logic 115 adds an MSB to a series of bits representing the data. Further, the glue logic 115 stores the data, with the added MSB, to the S_FIFO 120. When data is read from the S_FIFO 120, the glue logic 115 identifies the MSB. Based on the MSB, the glue logic 115, writes the data either to the CPU_i 105, e.g., for data received by the Rx_UART 125, or to the Tx_UART 130, e.g., for data generated by the CPU_i 105. In embodiments, the MSB may be added to the beginning of the data, e.g., to the beginning of a series of bits representing the data. For example, the MSB may be added to the left-most side of the series of bits representing the data. In alternative embodiments, the MSB may be added to the right-most side of the series of bits. In yet another alternative embodiment, the MSB may be added at some other location in the series of bits.

The Rx_UART 125 may receive data, e.g., from another device or component external to the UART device 100. The Rx_UART 125 may be a serial-to-parallel converter that receives data in a serial format, and converts the data to a parallel format. The Rx_UART 125 may output the converted data, e.g., in the form of a series of logical bits, towards CPU_i 105. The data is received and processed by the glue logic 115, e.g., as described herein.

The Tx_UART 130 may receive data from the glue logic 115, e.g., data generated by the CPU_i 105. The Tx_UART 130 may be a parallel-to-serial converter that receives the data in parallel format, and converts the data to serial format for transmission to an external device. The baud rate component 135 may generate different clocks for the Rx_UART 125 and the Tx_UART 130 channels.

As described herein, the Rx_UART 125 may receive data, e.g., from another device or component external to the UART device 100. The Rx_UART 125 may output the converted data, e.g., in the form of a series of logical bits, towards CPU_i 105. The data is received and processed by the glue logic 115. For example, the glue logic 115 may add an MSB to the data, and then write the data, with the added MSB to the S_FIFO 120. When this data is later read from the S_FIFO 120, the glue logic 115 may determine, based on the MSB, that the data was received by the Rx_UART 125. Based on this determination, the glue logic 115 may write the data to the CPU_i 105 channel so that CPU_i 105 can read, interpret, and/or process the data. In embodiments, the MSB may be removed prior to writing the data to the CPU_i 105 channel.

As described herein, the CPU_i 105 may generate data to transmit to an external component. The glue logic 115 may receive this data, add an MSB to the data, and store the data, with the added MSB, in the S_FIFO 120. When this data is later read from the S_FIFO 120, the glue logic 115 may determine, based on the MSB, that the data was received by the CPU_i 105. Based on this determination, the glue logic 115 may write the data to the Tx_UART 130 channel so that Tx_UART 130 can transmit the data to an external device. In embodiments, the MSB may be removed prior to writing the data to the Tx_UART 130 channel.

FIG. 2 shows a block diagram showing functional components and processes of a glue logic in accordance with aspects of the present invention. As shown in FIG. 2, a glue logic 115 may data from the Rx_UART 125 or the CPU_i 105. The data is received by a multiplexer 205 of the glue logic 115, and stored in the S_FIFO 120. Prior to storing the data in the S_FIFO 120, as described above, an MSB, e.g., shown at reference numeral 210, is appended to each series of bits representing individual instances of data. In the example of FIG. 2, the MSB is added at the beginning of each series of bits. However, as described herein, the MSB may be added at any position in the series of bits. When data is read from the S_FIFO 120, the glue logic 115 reads the MSB, and writes the data either to the CPU_i 105 channel or the Tx_UART 130 channel, e.g., based on the MSB.

FIG. 3 shows a flowchart of an example process for reading and writing data to and from CPU and UART interfaces using a single synchronous FIFO UART architecture in accordance with aspects of the present invention. In embodiments, FIG. 3 may be performed by the glue logic 115. FIG. 3 shows an example WRITE process (shown at block 305) in which data is received from either the CPU_i 105 or the Tx_UART 130. FIG. 3 further shows an example READ process (shown at block 335) in which data is read from the S_FIFO 120.

For the WRITE process, e.g., when data is received from either the CPU_i 105 or the Rx_UART 125, a determination is made as to whether the S_FIFO 120 is full (step 310). For example, the determination may be made based on the amount of data stored in the S_FIFO 120 relative to the maximum capacity of the S_FIFO 120. If the S_FIFO 120 is full (step 310—YES), at step 315, the process may pause until the S_FIFO 120 is no longer full. For example, data may be deleted from the FIFO after the data has been written to either the CPU_i 105 and/or Tx_UART 130 interfaces, as described herein.

After the S_FIFO 120 is no longer full, or if a determination was made that the S_FIFO 120 was not full (step 310—NO), at step 320, a determination is made as to whether the data was received from the Rx_UART 125. For example, the determination may be made based on an identifying bit and/or other information included in the data that identifies whether or not the data was received from the Rx_UART 125. If, for example, the data was received from the RX_UART 125 (step 320—YES), at step 325, an MSB bit of "0" is added to the data, and the data, with the added MSB bit, is written to the S_FIFO 120 (step 325). If, on the other hand, the data was not received from the Rx_UART 125 (step 320—NO), e.g., when the data is received from the CPU_i 105, an MSB bit of "1" is added to the data, and the data, with the added MSB bit is then written to the S_FIFO 120 (step 330).

For a READ process (block 335), a determination is made as to whether the S_FIFO 120 is empty (step 340). For example, the determination may be made based on whether data is currently being stored in the S_FIFO 120. In embodiments, the S_FIFO 120 may be queried, and the S_FIFO 120 may return an error when the S_FIFO 120 is empty. The S_FIFO 120 may then output data after data is stored in the S_FIFO 120, e.g., in accordance with the WRITE process 305 as described above. If, for example, the S_FIFO 120 is empty (step 340—YES), the process may pause until the S_FIFO 120 is no longer empty (step 345). After the S_FIFO is no longer empty, e.g., after the S_FIFO 120 outputs data after the data is stored in the S_FIFO 120, or if the S_FIFO 120 was not empty when originally queried (step 340—NO), the data is then read from the S_FIFO 120 (step 350).

At step 355, a determination is made as to whether the MSB is "1". For example, if the MSB is the left-most bit in the series of bits representing the data, a determination is made as to whether the left-most bit is "1". In alternative embodiments, if a bit in a different position other than the left-most bit is the MSB, then a determination is made as to whether the bit, corresponding to the MSB, is "1". If, for example, the MSB is "1" (step 355—YES), the data is written to the Tx_UART 130 interface. In the example of FIG. 3, the MSB bit of "1" indicates that the data was generated by the CPU_i 105, and therefore, should be outputted by Tx_UART 130. If, on the other hand, the MSB is not "1", e.g. is "0", the data is written to the CPU_i 105 interface. In the example of FIG. 3, the MSB bit of "0" indicates that the data was received by Rx_UART 125, and therefore, should be outputted to CPU_i 105. While in the example of FIG. 3, the MSB bit of "0" represents data received from the Rx_UART 125, and the MSB bit of "1" represents data received from the CPU_i 105, in practice, the MSB bit of "0" may represent data received from the CPU_i 105, and the MSB bit of "1" may represent data received from the Rx_UART 125.

The foregoing examples have been provided for the purpose of explanation and should not be construed as limiting the present invention. While the present invention has been described with reference to an exemplary embodiment, Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A method comprising:
receiving, via glue logic implemented in a Universal Asynchronous Receiver/Transmitter (UART) device, data from either a computer processing unit (CPU) interface of a computing device or from a receiver interface;
determining, by the glue logic, a source from which the data was received, wherein the determining the source comprises determining whether the data was received from either the CPU interface or the receiver interface;
adding, by the glue logic, a most significant bit (MSB) to the data, wherein a value of the MSB represents the source from which the data was received and is based on whether the data was received from either the CPU interface or the receiver interface; and
writing, by the glue logic, the data with the added MSB to a data buffering and storage component.

2. The method of claim 1, further comprising:
reading the data from the data buffering and storage component;
identifying the value of the MSB included in the data; and
writing the data, based on the value of the MSB, to a channel associated with the CPU interface or to a channel associated with a transmitter component interface of the computing device.

3. The method of claim 1, wherein an MSB value of 0 indicates that the data was received from the CPU interface and a value of 1 indicates that the data was received from the receiver component interface.

4. The method of claim 1, wherein an MSB value of 1 indicates that the data was received from the CPU interface and a value of 0 indicates that the data was received from the receiver interface.

5. The method of claim 1, wherein adding the MSB to the data includes writing or appending the MSB to a series of bits representing the data.

6. The method of claim 5, wherein writing or appending the MSB to the series of bits representing the data includes writing or appending the MSB to the left-most side of the series of bits representing the data.

7. The method of claim 5, wherein writing or appending the MSB to the series of bits representing the data includes writing or appending the MSB to the right-most side of the series of bits representing the data.

8. The method of claim 1, wherein the data buffering and storage component is a first-in-first-out (FIFO) data storage component.

9. The method of claim 8, wherein the FIFO data storage component is a synchronous FIFO data storage component.

10. The method of claim 9, wherein the computing device includes no more than one synchronous FIFO data storage component.

11. The method of claim 1, wherein the computing device is associated with a a Universal Asynchronous Receiver/Transmitter (UART) device.

12. A Universal Asynchronous Receiver/Transmitter (UART) device comprising a glue logic configured to:
receive data from either a computer processing unit (CPU) interface of the UART device or from a receiver interface of the UART device;
determine a source from which the data was received, wherein the determining the source comprises determining whether the data was received from either the CPU interface or the receiver interface;
add a most significant bit (MSB) to the data, wherein a value of the MSB represents the source from which the data was received and is based on whether the data was received from either the CPU interface or the receiver interface;
write the data with the added MSB to a data buffering and storage component;
read the data from the data buffering and storage component;
identify the value of the MSB included in the data; and
write the data, based on the value of the MSB, to a channel associated with the CPU interface or to a channel associated with a transmitter component interface of the UART device.

13. The UART device of claim 12, wherein an MSB value of 0 indicates that the data was received from the CPU interface and a value of 1 indicates that the data was received from the receiver interface.

14. The UART device of claim 12, wherein an MSB value of 1 indicates that the data was received from the CPU interface and a value of 0 indicates that the data was received from the receiver interface.

15. The UART device of claim 12, wherein when adding the MSB, the glue logic writes or append the MSB to a series of bits representing the data.

16. The UART device of claim 12, wherein the data buffering and storage component is a synchronous first-in-first-out (FIFO) data storage component.

17. The UART device of claim 16, wherein the UART device includes no more than one synchronous FIFO data storage component.

18. A system comprising:
a computer processing unit (CPU) interface;
a receiver interface;
a transmitter interface;
a synchronous first-in-first-out (FIFO) data storage component; and
a glue logic configured to:
receive data from either the CPU interface or the receiver interface;
determine a source from which the data was received, wherein the determining the source comprises determining whether the data was received from either the CPU interface or the receiver interface;
add a most significant bit (MSB) to the data, wherein a value of the MSB represents the source from which the data was received and is based on whether the data was received from either the CPU interface or the receiver interface;
write the data with the added MSB to the synchronous FIFO data storage component;
read the data from the synchronous FIFO data storage component;
identify the value of the MSB included in the data; and
write the data, based on the value of the MSB, to a channel associated with the CPU interface or to a channel associated with the transmitter interface.

19. The system of claim 18, wherein the system includes no more than one synchronous FIFO data storage component.

20. The system of claim 18, wherein an MSB value of 1 indicates that the data was received from the CPU interface and a value of 0 indicates that the data was received from the receiver interface, wherein when adding the MSB to the data, the glue logic is further configured to write or append the MSB to a series of bits representing the data includes to the left-most side of the series of bits representing the data.

\* \* \* \* \*